US011942702B2

(12) United States Patent
Sakurai

(10) Patent No.: US 11,942,702 B2
(45) Date of Patent: Mar. 26, 2024

(54) WIRELESS COMMUNICATION APPARATUS

(71) Applicant: FCNT LIMITED, Yamato (JP)

(72) Inventor: Minoru Sakurai, Yamato (JP)

(73) Assignee: FCNT LIMITED, Yamato (JP)

( * ) Notice: Subject to any disclaimer, the term of this patent is extended or adjusted under 35 U.S.C. 154(b) by 147 days.

(21) Appl. No.: 17/735,177

(22) Filed: May 3, 2022

(65) Prior Publication Data

US 2022/0263243 A1 Aug. 18, 2022

Related U.S. Application Data

(63) Continuation of application No. PCT/JP2019/043757, filed on Nov. 7, 2019.

(51) Int. Cl.

*H01Q 7/02* (2006.01)
*H01Q 7/00* (2006.01)
*H01Q 9/30* (2006.01)

(52) U.S. Cl.

CPC ............... *H01Q 7/02* (2013.01); *H01Q 7/005* (2013.01); *H01Q 9/30* (2013.01)

(58) Field of Classification Search

None
See application file for complete search history.

(56) References Cited

U.S. PATENT DOCUMENTS 10,862,216 B1 * 12/2020 Ayala Vazquez ...... H01Q 21/28
2012/0112969 A1 5/2012 Caballero et al.
2012/0231750 A1 9/2012 Jin et al.
2013/0050046 A1 * 2/2013 Jarvis ..................... H01Q 9/145 343/852
2015/0005037 A1 1/2015 Caballero et al.
2016/0308271 A1 * 10/2016 Jin ........................... H01Q 1/48
2017/0194692 A1 * 7/2017 Sayama ................... H01Q 9/42
2018/0191063 A1 * 7/2018 Sonoda ................ H01Q 9/0457
(Continued)

FOREIGN PATENT DOCUMENTS

EP 3 413 543 A1 12/2018
JP 2012-227850 A 11/2012
JP 2019-16838 A 1/2019
(Continued)

OTHER PUBLICATIONS

International Search Report dated Jan. 28, 2020, issued in counterpart International Application No. PCT/JP2019/043757 (2 pages).

*Primary Examiner* — Wilson Lee
(74) *Attorney, Agent, or Firm* — WHDA, LLP

(57) ABSTRACT

The wireless communication apparatus includes a metal frame which encloses a side surface of a main body portion formed in a plate shape, and a ground plate which is housed in the main body portion. The metal frame includes a monopole antenna which is electrically connected to a feeding point at an intermediate portion of a first frame defined by a first gap and a second gap provided on the metal frame and which resonates with a radio wave at a first frequency defined by the intermediate portion and the second gap, a first conductive portion, and a second conductive portion. A length combining the monopole antenna and the first conductive portion is a length enabling the monopole antenna and the first conductive portion to resonate with a radio wave at the first frequency as a loop antenna.

6 Claims, 16 Drawing Sheets

(56) References Cited

U.S. PATENT DOCUMENTS

2018/0375973 A1* 12/2018 Song ...................... B22D 17/00
2019/0074601 A1 3/2019 Kim et al.

FOREIGN PATENT DOCUMENTS

WO 2012/061349 A1 5/2012
WO 2012/121861 A1 9/2012
WO 2016/125556 A1 8/2016

* cited by examiner

FIG. 9

| | FREE SPACE | WITH THUMB | AMOUNT OF DETERIORATION |
|---|---|---|---|
| FIRST COMPARATIVE EXAMPLE | -1.4 | -16.9 | -15.5 |
| SECOND COMPARATIVE EXAMPLE | -13.4 | -9.3 | +4.1 |
| EMBODIMENT | -1.3 | -11.3 | -10.0 |

WIRELESS COMMUNICATION APPARATUS

CROSS-REFERENCE TO RELATED APPLICATION

This application is a continuation application of International Application PCT/JP2019/043757 filed on Nov. 7, 2019 and designated the U.S., the entire contents of which are incorporated herein by reference.

FIELD

The embodiments discussed herein are related to a wireless communication apparatus.

BACKGROUND

Wireless communication apparatuses such as smartphones are known. When such a wireless communication apparatus is gripped by a hand, antenna performance may decline.

For example, Japanese Patent Application Laid-open No. 2012-227850 describes a mobile wireless terminal in which an antenna device is provided in a main body and an exterior frame is divided into a first metal frame and a second metal frame across a gap portion. With the mobile wireless terminal, when a hand comes into contact with the gap portion and causes the first metal frame and the second metal frame to be connected to each other at a high frequency, the second metal frame becomes grounded and a decline in a resonant frequency of the antenna device is suppressed.

DOCUMENT OF PRIOR ART

Patent Document

[Patent document 1] Japanese Laid-open Patent Publication No. 2012-227850

SUMMARY

One aspect of the disclosed technique can be exemplified by a wireless communication apparatus such as that described below. The present wireless communication apparatus includes: a metal frame which encloses a side surface of a main body portion formed in a plate shape; and a ground plate which is housed in the main body portion, wherein the metal frame includes: a monopole antenna which is electrically connected to a feeding point at an intermediate portion of a first frame defined by a first gap and a second gap provided on the metal frame and which resonates with a radio wave at a first frequency defined by the intermediate portion and the second gap; a first conductive portion which is defined by the second gap and a third gap provided on the metal frame and which is insulated from the ground plate; and a second conductive portion which is defined by the first gap and the third gap and of which at least an end on the third gap side is electrically connected to the ground plate, a length combining the monopole antenna and the first conductive portion being a length enabling the monopole antenna and the first conductive portion to resonate with a radio wave at the first frequency as a loop antenna.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 9 is a diagram comparing radiation efficiencies of the first comparative example, the second comparative example, and the embodiment;

DESCRIPTION OF EMBODIMENTS

Figure 1:
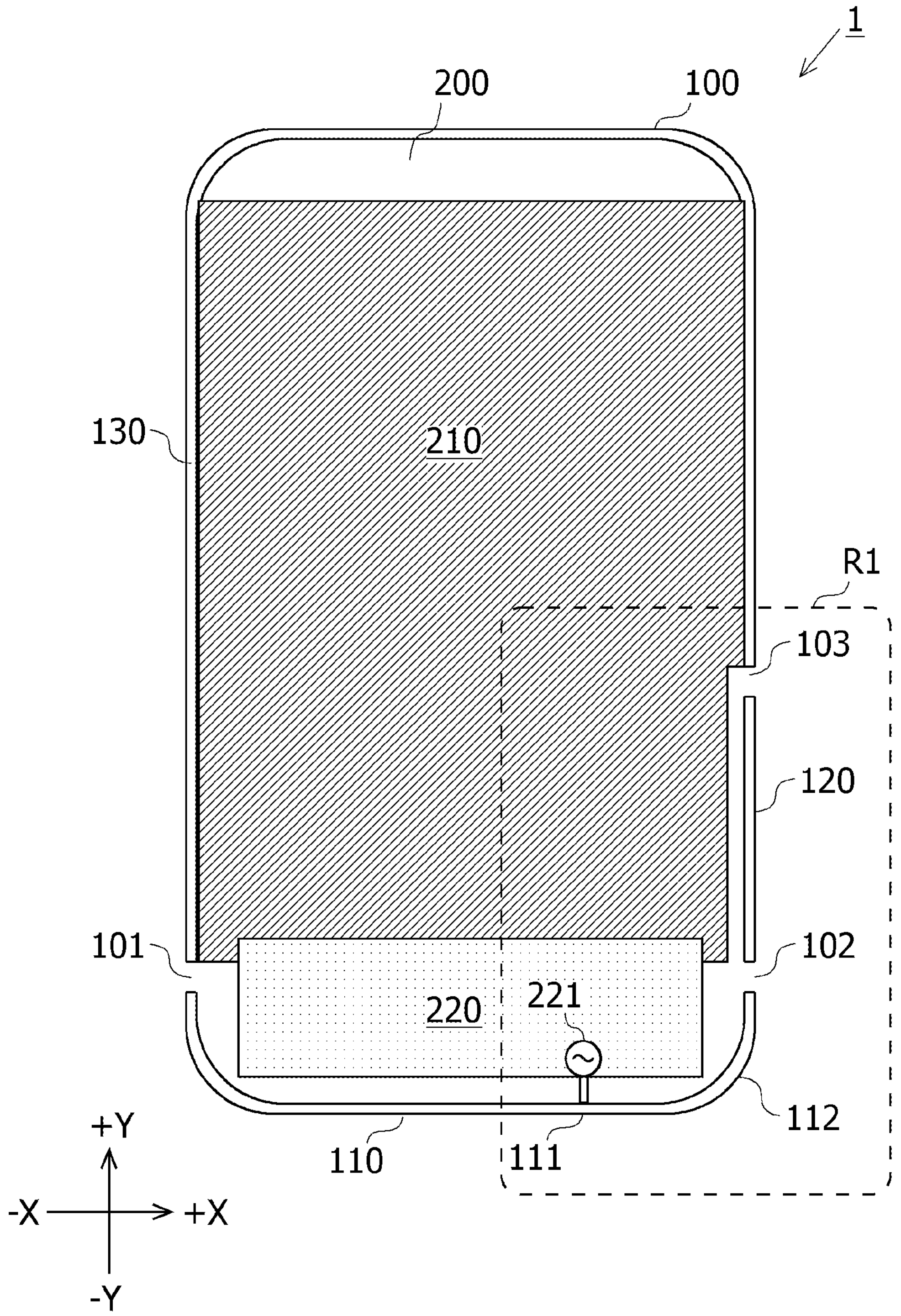
FIG. 1 is a diagram showing an example of a smartphone according to an embodiment.

In a wireless communication apparatus which uses a part of a metal frame constituting an exterior as an antenna, a portion used as the antenna and a portion not used as the antenna are electrically separated from each other by a gap. When such a wireless communication apparatus is gripped by a hand, the hand electrically connects the gap and changes an antenna length and, as a result, a resonant frequency of the antenna may vary. Therefore, there is a concern that performance of the antenna at a desired frequency may decline.

One aspect of the disclosed technique is to suppress, in a wireless communication apparatus which uses a metal frame constituting an exterior as an antenna, a decline in antenna performance due to a hand coming into contact with the metal frame.

Embodiment

Hereinafter, an embodiment will be described. It is to be understood that configurations of the embodiment described below are illustrative and that the disclosed technique is not limited to the configurations of the embodiment. A wireless communication apparatus according to the embodiment includes:

a metal frame which encloses a side surface of a main body portion formed in a plate shape; and a ground plate which is housed in the main body portion, wherein the metal frame includes:

a monopole antenna which is electrically connected to a feeding point at an intermediate portion of a first frame defined by a first gap and a second gap provided on the metal frame and which resonates with a radio wave at a first frequency defined by the intermediate portion and the second gap;

a first conductive portion which is defined by the second gap and a third gap provided on the metal frame and which is insulated from the ground plate; and a second conductive portion which is defined by the first gap and the third gap and of which at least an end on the third gap side is electrically connected to the ground plate, a length combining the monopole antenna and the first conductive portion being a length enabling the monopole antenna and the first conductive portion to resonate with a radio wave at the first frequency as a loop antenna.

In the present wireless communication apparatus, the ground plate is a grounded member. The ground plate may be a substrate being mounted with components or a metal plate not being mounted with components. In the wireless communication apparatus which uses a part of the metal frame as a monopole antenna, the monopole antenna is electrically separated from other regions of the metal frame by the first gap and the second gap. Since the metal frame encloses the side surface of the main body portion of the wireless communication apparatus, when the wireless communication apparatus is gripped by a hand, capacitive coupling of the first gap and the second gap by the hand may cause the monopole antenna to become electrically connected to other regions of the metal frame. When the monopole antenna is electrically connected to other regions of the metal frame, a change in an antenna length causes a resonant frequency of the monopole antenna to change. As a result, antenna performance at the first frequency declines.

In the wireless communication apparatus according to the present embodiment, the first conductive portion defined by the second gap and the third gap is not connected to the ground plate and a third gap-side of the second conductive portion is electrically connected to the ground plate. In addition, a length combining the monopole antenna and the first conductive portion is a length enabling the monopole antenna and the first conductive portion to resonate with a radio wave at the first frequency as a loop antenna. According to such a configuration, for example, even when each of the second gap and the third gap is capacitively coupled due to the present wireless communication apparatus being gripped by a hand, the wireless communication apparatus enables the monopole antenna and the first conductive portion to communicate as a loop antenna capable of resonating at the first frequency. Therefore, a decline in antenna performance with respect to a radio wave at the first frequency due to a hand coming into contact with the metal frame is suppressed. It may be noted that the metal frame may be formed in a rectangular shape and the first gap and the second gap may be formed on opposing long sides of the metal frame being formed in a rectangular shape. Examples of the wireless communication apparatus include a smartphone, a feature phone, a tablet computer, a notebook computer, and a wearable computer.

The wireless communication apparatus according to the embodiment may include the following feature. A length of the first conductive portion may be ¼ of a wavelength of a radio wave at the first frequency. In order to enable the monopole antenna and the first conductive portion to operate as a loop antenna capable of resonating at the first frequency, a length of the first conductive portion need be an odd multiple of ¼ of the wavelength of a radio wave at the first frequency. It is conceivable that, since the first conductive portion is separated from the ground plate, extending the first conductive portion makes the metal frame vulnerable with respect to external force. Making the first conductive portion equal to ¼ of the wavelength of a radio wave at the first frequency enables the second conductive portion which is capable of coming into contact with the ground plate to be extended as much as possible and enables a decline in strength of the metal frame to be suppressed.

The wireless communication apparatus according to the embodiment may include the following feature. A second feeding point which differs from the feeding point is connected to the first conductive portion, and a selection circuit is interposed between the first conductive portion and the second feeding point, the selection circuit separating the first conductive portion and the second feeding point from each other when power is being fed to the monopole antenna at the first frequency and connecting the first conductive portion and the second feeding point to each other when power is not being fed to the monopole antenna at the first frequency. By having such a feature, the first conductive portion can be used as an antenna which resonates at a frequency that differs from the first frequency. The selection circuit may include an LC parallel circuit which opens at the first frequency. In addition, the selection circuit may include a switch which separates the first conductive portion from the second feeding point when power is being fed to the monopole antenna from the feeding point and which connects the first conductive portion to the second feeding point when power is not being fed to the monopole antenna from the feeding point.

Hereinafter, the embodiment will be further described with reference to the drawings. FIG. 1 is a diagram showing an example of a smartphone according to the embodiment. FIG. 1 illustrates a state where a front surface-side cover of a smartphone 1 according to the embodiment has been opened. The smartphone 1 includes a frame-like side surface frame 100 and a ground plate 210 and a printed substrate 220 which are housed inside a main body portion 200 being defined by the side surface frame 100. The smartphone 1 has a plate shape formed in an approximately rectangular shape as a whole. Hereinafter, in the present specification, a +Y direction will also be referred to as an upward direction, a −Y direction will also be referred to as a downward direction, a +X direction will also be referred to as a rightward direction, and a −X direction will also be referred to as a leftward direction. In addition, in FIG. 1, a direction toward a near side is assumed to be a forward direction and a direction toward a far side is assumed to be a rearward direction. The smartphone 1 is an example of the "wireless communication apparatus".

The smartphone 1 is a portable wireless communication apparatus. In the smartphone 1, various electronic components including a Central Processing Unit (CPU), a main storage portion, and an auxiliary storage portion are housed inside the main body portion 200 being defined by front and rear covers and the side surface frame 100.

The side surface frame 100 is a cover which encloses the side surface of the smartphone 1. The side surface frame 100 can also be described as a cover which encloses the side surface of the main body portion 200. For example, the side surface frame 100 is formed by a conductor made of metal or the like. The side surface frame 100 has an approximately rectangular shape in order to enclose the side surface of the smartphone 1 with an approximately rectangular shape. The side surface frame 100 is provided with a plurality of slits 101, 102, and 103. The slits 101 and 102 are provided in lower parts of long sides that oppose each other among the side surface frame 100. The slit 103 is provided above the slit 102 on the same long side on which the slit 102 is provided among the side surface frame 100. For example, each of the slits 101, 102, and 103 may be filled with resin. The side surface frame 100 is an example of the "metal frame". The slit 101 is an example of the "first gap". The slit 102 is an example of the "second gap". The slit 103 is an example of the "third gap".

The printed substrate 220 is a substrate that can be mounted with various electronic components. For example, the printed substrate 220 is arranged in a lower part inside the main body portion 200. The printed substrate 220 has a feeding point 221.

A lower frame 110 is a region defined by the slits 101 and 102 among the side surface frame 100. The lower frame 110 is electrically connected to the feeding point 221 at an intermediate portion 111 thereof. A region defined by the intermediate portion 111 and the slit 102 among the lower frame 110 constitutes an antenna device 112. The antenna device 112 is an antenna device to which power is fed from the feeding point 221. The intermediate portion 111 is an example of the "intermediate portion". The feeding point 221 is an example of the "feeding point". The lower frame 110 is an example of the "first frame".

The antenna device 112 is a monopole antenna which resonates with a radio wave at the first frequency. For example, a length of the antenna device 112 is ¼ of a wavelength of a radio wave at the first frequency. For example, the first frequency is 2.2 GHz. The antenna device 112 is an example of the "monopole antenna".

A side surface conductor device 120 is a region defined by the slits 102 and 103 among the side surface frame 100. The side surface conductor device 120 is a conductor device which does not come into contact with the ground plate 210. In other words, the side surface conductor device 120 is an ungrounded conductor device. For example, a length of the side surface conductor device 120 is ¼ of a wavelength of a radio wave at the first frequency. The side surface conductor device 120 is an example of the "first conductive portion".

An upper frame 130 is a region defined by the slits 101 and 103 among the side surface frame 100. The ground plate 210 is a grounded metal plate, a mounting substrate, or the like. For example, the ground plate 210 is arranged in an upper part inside the main body portion 200. For example, by coming into contact with an inside of the upper frame 130 among the side surface frame 100, the ground plate 210 grounds the upper frame 130 and, at the same time, increases strength of the upper frame 130. The upper frame 130 is an example of the "second conductive portion".

Among the side surface frame 100, at least the antenna device 112 and the side surface conductor device 120 are separated from the ground plate 210. In other words, the antenna device 112 and the side surface conductor device 120 are not electrically connected to the ground plate 210. The ground plate 210 is an example of the "ground plate".

Figure 2:
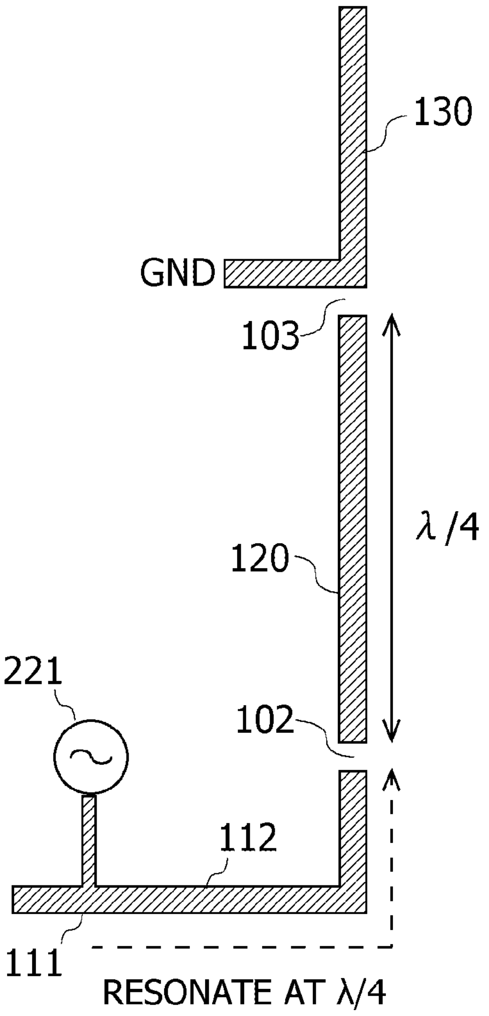
FIG. 2 is a first diagram schematically showing a portion enclosed by a rectangle R1 in FIG. 1.
Figure 3:
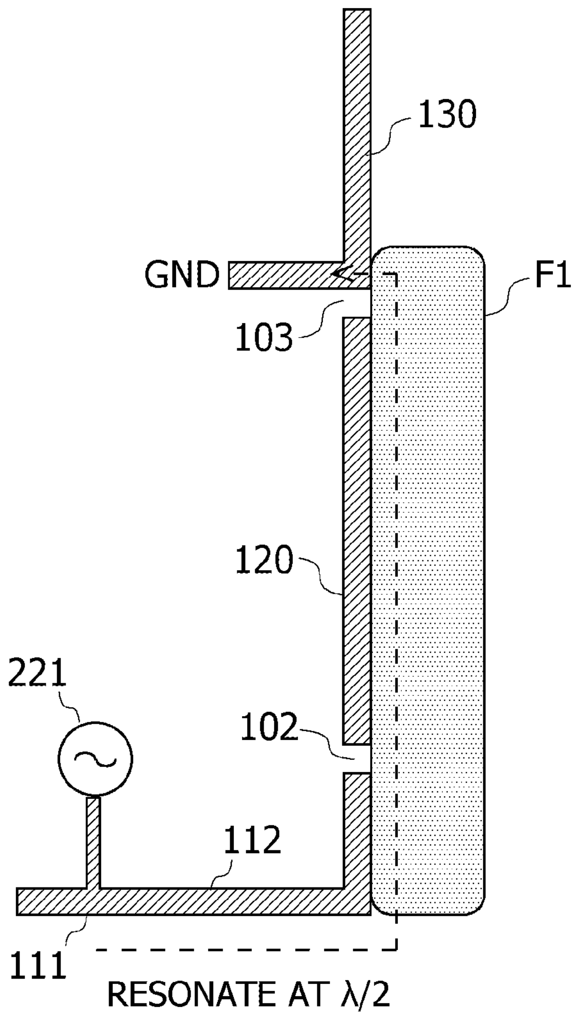
FIG. 3 is a second diagram schematically showing the portion enclosed by the rectangle R1 in FIG. 1.

FIGS. 2 and 3 are diagrams schematically showing a portion enclosed by a rectangle R1 in FIG. 1. FIG. 2 illustrates a state where a finger is not in contact with the side surface frame 100 and FIG. 3 illustrates a state where a finger is in contact with the side surface frame 100. In FIG. 2, since neither the slit 102 nor the slit 103 is electrically connected, the antenna device 112 is a monopole antenna which operates with a radio wave at the first frequency.

FIG. 3 illustrates a state where a user of the smartphone 1 grips the smartphone 1 with a hand. As a result, the hand (for example, a thumb F1) of the user electrically connects the slit 102 due to capacitive coupling and, at the same time, electrically connects the slit 103 due to capacitive coupling. In the present embodiment, at least an end on the side of the slit 103 of the upper frame 130 is grounded by being electrically connected to the ground plate. Therefore, when each of the slits 102 and 103 is capacitively coupled, a loop antenna is formed from the intermediate portion 111 being electrically connected to the feeding point 221 via the antenna device 112 and the side surface conductor device 120 to ground from the end on the side of the slit 103 of the upper frame 130. In this case, since the length of the antenna device 112 is ¼ of the wavelength of the radio wave at the first frequency and the length of the side surface conductor device 120 is ¼ of the wavelength of the radio wave at the first frequency, the length of the formed loop antenna is ½ of the wavelength of the radio wave at the first frequency. In other words, the formed loop antenna is a loop antenna which resonates at the first frequency.

Therefore, the smartphone 1 enables communication to be performed using the monopole antenna that resonates at ¼ of the wavelength of the radio wave at the first frequency in a state where the smartphone 1 is not gripped by a hand and enables communication to be performed using the loop antenna that resonates at ½ of the wavelength of the radio wave at the first frequency in a state where the smartphone 1 is being gripped by a hand. In other words, with the smartphone 1, the frequency at which an antenna resonates does not vary significantly between before and after gripping the smartphone 1 with a hand. That is, the smartphone 1 enables communication to be performed in an efficient manner with a radio wave at the first frequency in both a state where the smartphone 1 is being gripped by a hand and a state where the smartphone 1 is not gripped by a hand.

Figure 4:
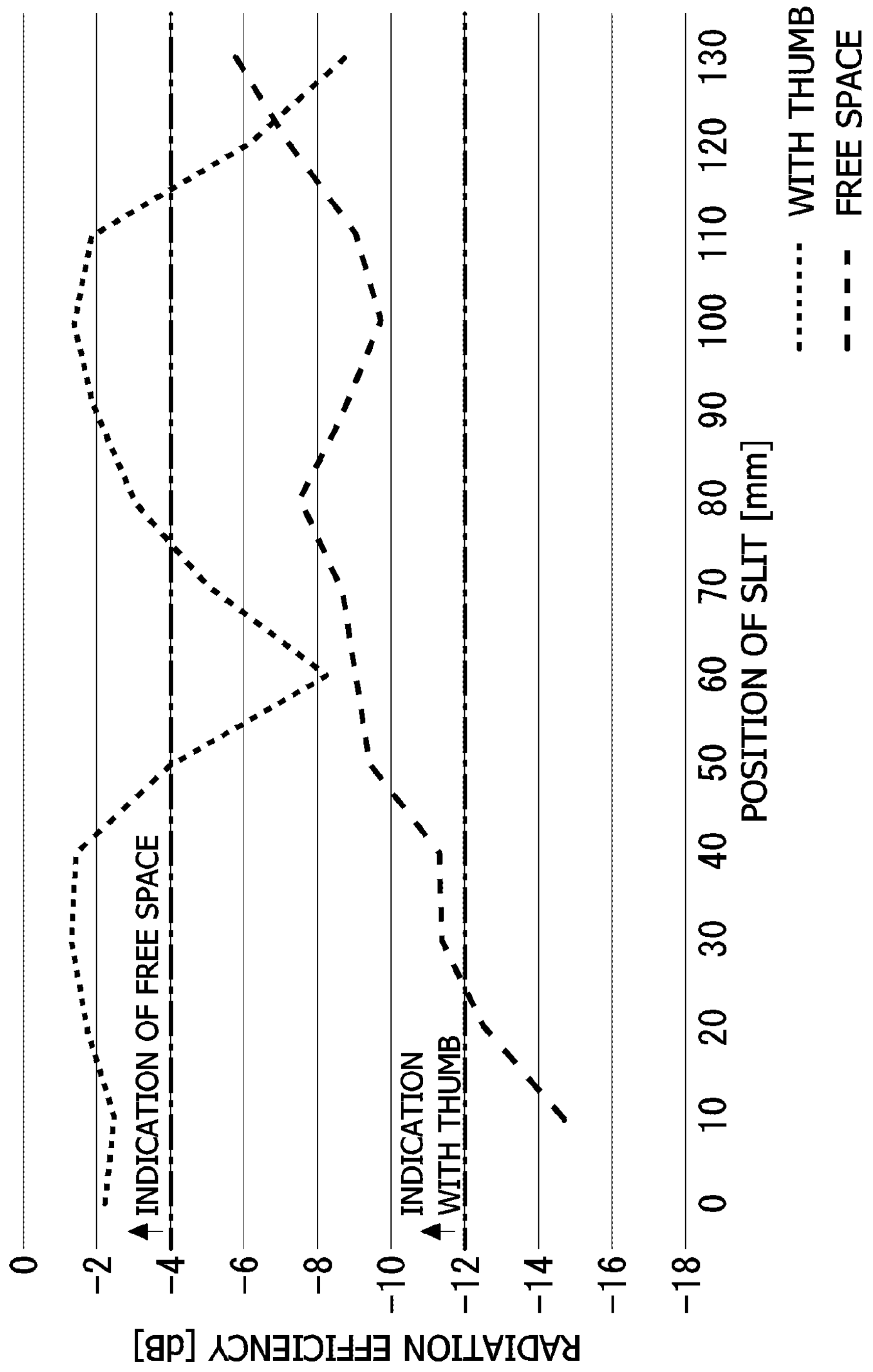
FIG. 4 is a diagram illustrating radiation efficiency of an antenna of the smartphone according to the embodiment.

The length of the side surface conductor device 120 will now be considered. FIG. 4 is a diagram illustrating radiation efficiency of an antenna of the smartphone according to the embodiment. FIG. 4 illustrates radiation efficiency with respect to a radio wave at a frequency of 2.2 GHz when the length of the side surface conductor device 120 is varied by fixing a position of the slit 102 but moving a position of the slit 103. An ordinate in FIG. 4 illustrates radiation efficiency (dB) and an abscissa in FIG. 4 illustrates a position (mm) of the slit 103 relative to the slit 102. In other words, the abscissa illustrates the length of the side surface conductor device 120. FIG. 4 illustrates both radiation efficiency in a case (with thumb) where both slits 102 and 103 are capacitively coupled by the thumb F1 and radiation efficiency in a case (free space) where neither of the slits 102 and 103 is capacitively coupled. In addition, FIG. 4 illustrates an indication (indication of free space) of radiation efficiency in a free space and a standard (indication with thumb) of radiation efficiency with a thumb. In this case, relative permittivity of the thumb F1 is assumed to be 40.0 and specific electric conductivity is assumed to be 1.40 Sim.

Referring to FIG. 4, it can be understood that the length of the side surface conductor device 120 which causes the radiation efficiency in a free space to exceed the indication of free space and the radiation efficiency with a thumb to exceed the indication with a thumb ranges from 30 mm to 40 mm and from 100 mm to 110 mm. The range from 30 mm to 40 mm corresponds to ¼ of a wavelength of 2.2 GHz and the range from 100 mm to 110 mm corresponds to ¾ of the wavelength of 2.2 GHz. Accordingly, it can be understood that the length of the side surface conductor device 120 is preferably an odd multiple of ¼ of a wavelength of a radio wave at which the antenna device 112 resonates.

As described above, preferable radiation efficiency can be realized when the length of the side surface conductor device 120 is an odd multiple of ¼ of a wavelength of a radio wave at which the antenna device 112 resonates. However, since the side surface conductor device 120 does not come into contact with the ground plate 210, extending the length of the side surface conductor device 120 creates a risk of reducing the strength of the side surface frame 100. In addition, extending the length of the side surface conductor device 120 is disadvantageous in terms of downsizing the smartphone 1. In consideration thereof, the length of the side surface conductor device 120 is preferably ¼ of a wavelength of a radio wave at the first frequency.

First Comparative Example

Figure 5:
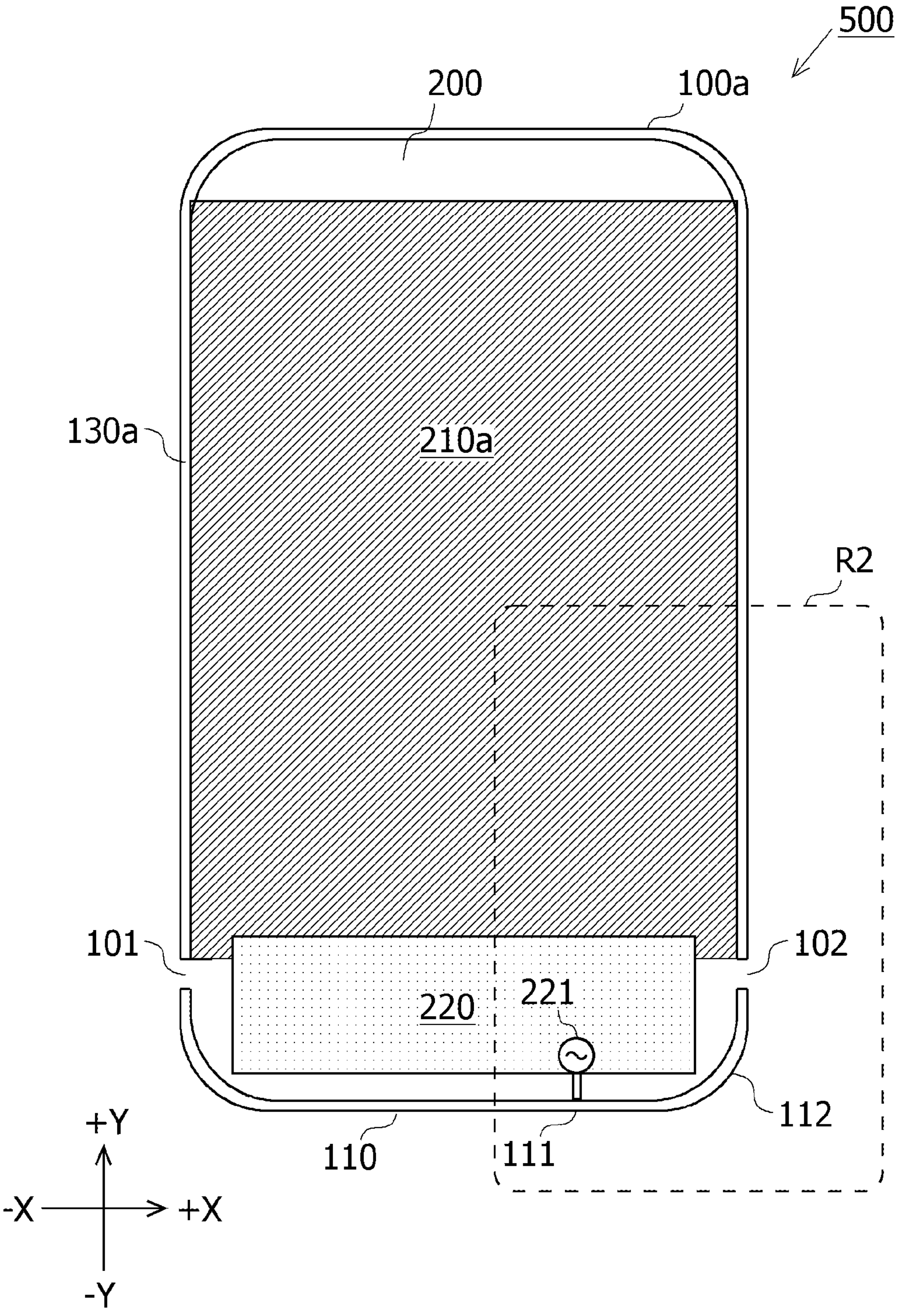
FIG. 5 is a diagram showing an example of a smartphone according to a first comparative example.

Comparative examples will now be explained. FIG. 5 is a diagram showing an example of a smartphone according to a first comparative example. FIG. 5 illustrates a state where a front surface-side cover of a smartphone 500 according to the first comparative example has been opened. Hereinafter, the smartphone 500 according to the first comparative example will be explained with reference to the drawings.

A side surface frame 100*a* differs from the side surface frame 100 in that the side surface frame 100*a* does not include the slit 103. A ground plate 210*a* differs from the ground plate 210 in that the ground plate 210*a* comes into contact with an inside of the side surface frame 100*a* even in a portion corresponding to the side surface conductor device 120 according to the embodiment. An upper frame 130*a* is an upper-side region of a region defined by the slits 101 and 102 among the side surface frame 100*a*. As is evident from reference to FIG. 5, an end on the side of the slit 102 of the upper frame 130*a* is grounded.

Figure 6:
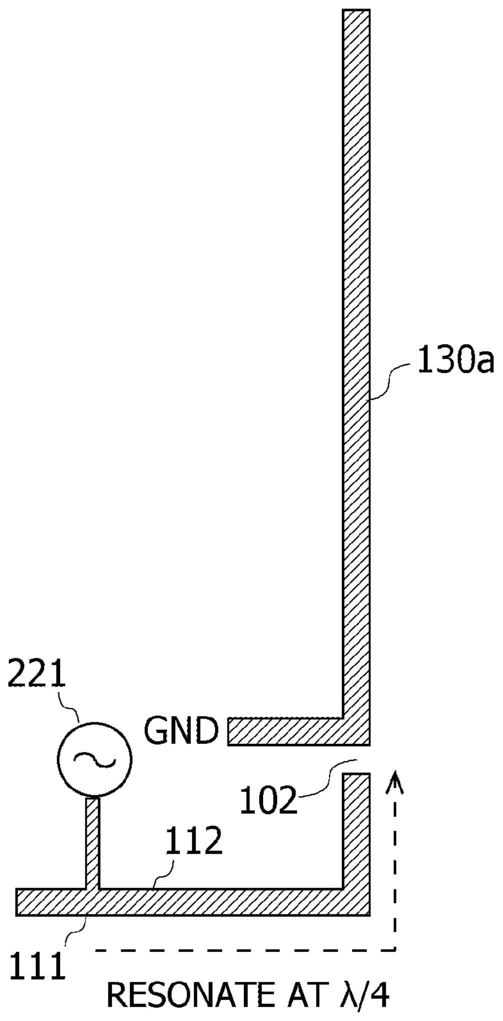
FIG. 6 is a first diagram schematically showing a portion enclosed by a rectangle R2 in FIG. 5.
Figure 7:
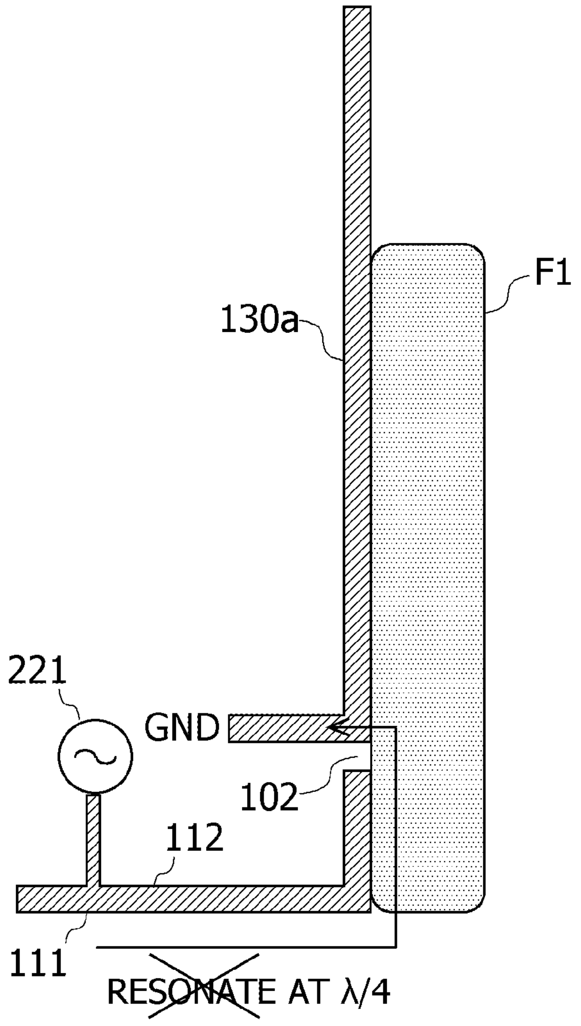
FIG. 7 is a second diagram schematically showing the portion enclosed by the rectangle R2 in FIG. 5.

FIGS. 6 and 7 are diagrams schematically showing a portion enclosed by a rectangle R2 in FIG. 5. FIG. 6 illustrates a state where a finger is not in contact with the side surface frame 100*a* and FIG. 7 illustrates a state where a finger is in contact with the side surface frame 100*a*. In FIG. 6, since the slit 102 is not electrically connected, the antenna device 112 is a monopole antenna which operates with a radio wave at the first frequency.

FIG. 7 illustrates a state where a user of the smartphone 500 grips the smartphone 500 with a hand. As a result, the hand (for example, the thumb F1) of the user electrically connects the slit 102 due to capacitive coupling. In the first comparative example, at least an end on the side of the slit 102 of the upper frame 130*a* is grounded by being electrically connected to the ground plate. Therefore, when the slit 102 is capacitively coupled, a connection to ground is established from the end on the side of the slit 102 of the upper frame 130*a* via the antenna device 112 from the intermediate portion 111 being electrically connected to the feeding point. In other words, due to grounding of an open end of the antenna device 112 which is a monopole antenna, a resonant frequency of the antenna device 112 ends up significantly varying from the first frequency.

Second Comparative Example

Figure 8:
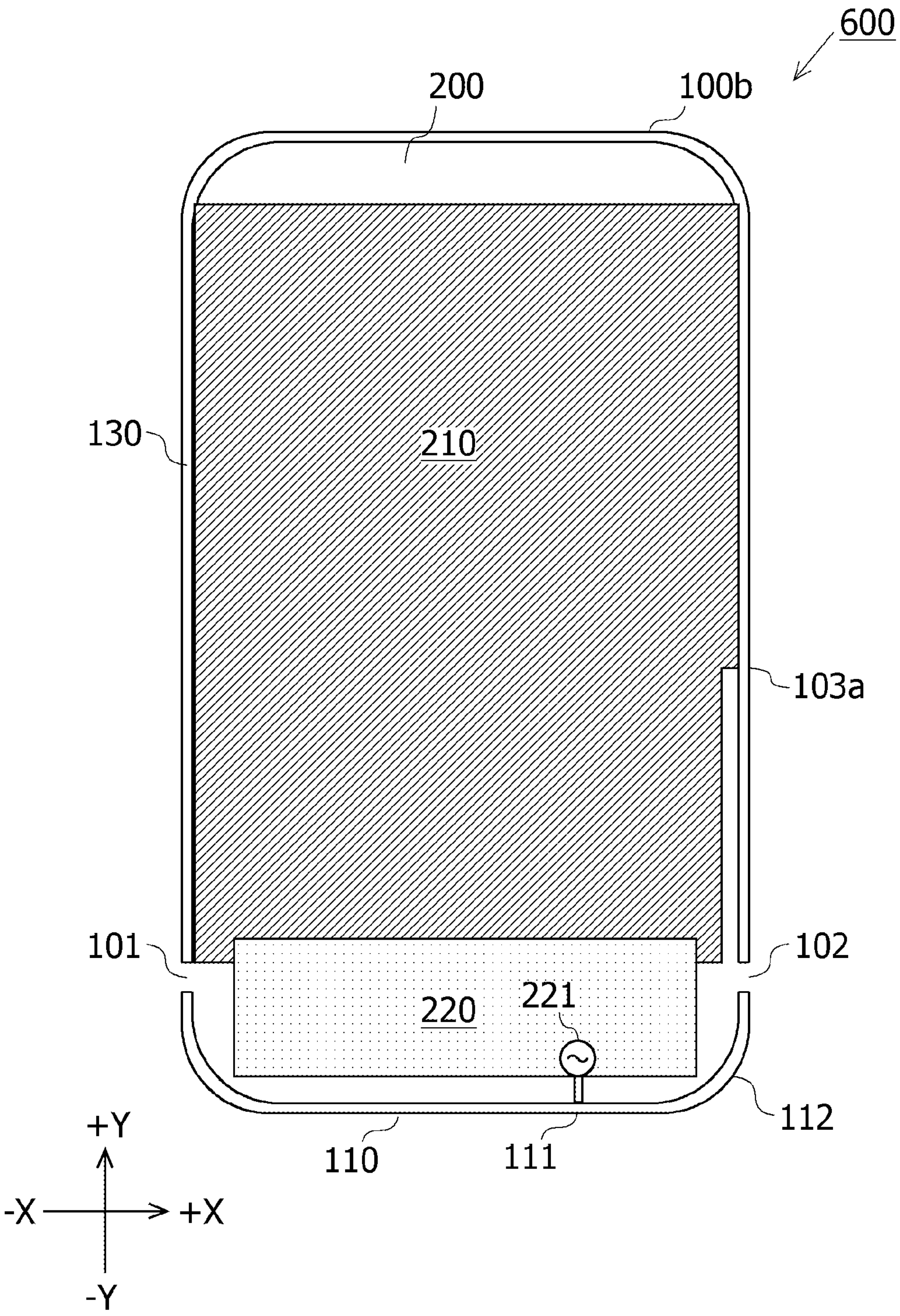
FIG. 8 is a diagram showing an example of a smartphone according to a second comparative example.

Next, a second comparative example will be explained. FIG. 8 is a diagram showing an example of a smartphone according to the second comparative example. FIG. 8 illustrates a state where a front surface-side cover of a smartphone 600 according to the second comparative example has been opened. The smartphone 600 according to the second comparative example differs from the smartphone 1 according to the embodiment in that the smartphone 600 does not have a slit 103 on a side surface frame 100*b*. Even in the smartphone 600 according to the second comparative example, the side surface frame 100*b* is electrically connected to the ground plate 210 at at least a slit-corresponding position 103*a* which corresponds to the slit 103 on the smartphone 1. When the smartphone 600 according to the second comparative example is gripped by a hand, a loop antenna that resonates with a radio wave at the first frequency can be formed in a similar manner to the smartphone 1 according to the embodiment.

Comparison Among First Comparative Example, Second Comparative Example, and Embodiment FIG. 9 is a diagram comparing radiation efficiencies of the first comparative example, the second comparative example, and the embodiment. FIG. 9 illustrates radiation efficiency of a radio wave at a frequency of 2.2 GHz and assumes relative permittivity of the thumb F1 to be 40.0 and specific electric conductivity to be 1.40 S/m. Referring to FIG. 9, with the smartphone 500 according to the first comparative example, radiation efficiency in free space is −1.4 dB, radiation efficiency with thumb is −16.9 dB, and an amount of deterioration of the radiation efficiency with thumb relative to free space is −15.5 dB. With the smartphone 600 according to the second comparative example, radiation efficiency in free space is −13.4 dB, radiation efficiency with thumb is −9.3 dB, and an amount of deterioration of the radiation efficiency with thumb relative to free space is +4.1 dB. With the smartphone 1 according to the embodiment, radiation efficiency in free space is −1.3 dB, radiation efficiency with thumb is −11.3 dB, and an amount of deterioration of the radiation efficiency with thumb relative to free space is −10.0 dB.

In other words, with the smartphone 500 according to the first comparative example, it can be understood that radiation efficiency is lower than the smartphone 1 according to the embodiment in both free space and with thumb. On the other hand, with the smartphone 600 according to the second comparative example, it can be understood that while radiation efficiency with thumb is slightly improved from the smartphone 1 according to the embodiment, radiation efficiency in free space is significantly poor. With the smartphone 1 according to the embodiment, it can be understood that radiation efficiency in free space is higher than both the first comparative example and the second comparative example and that radiation efficiency comparable to that of the second comparative example can be realized with thumb.

Other Comparative Examples

Figure 10:
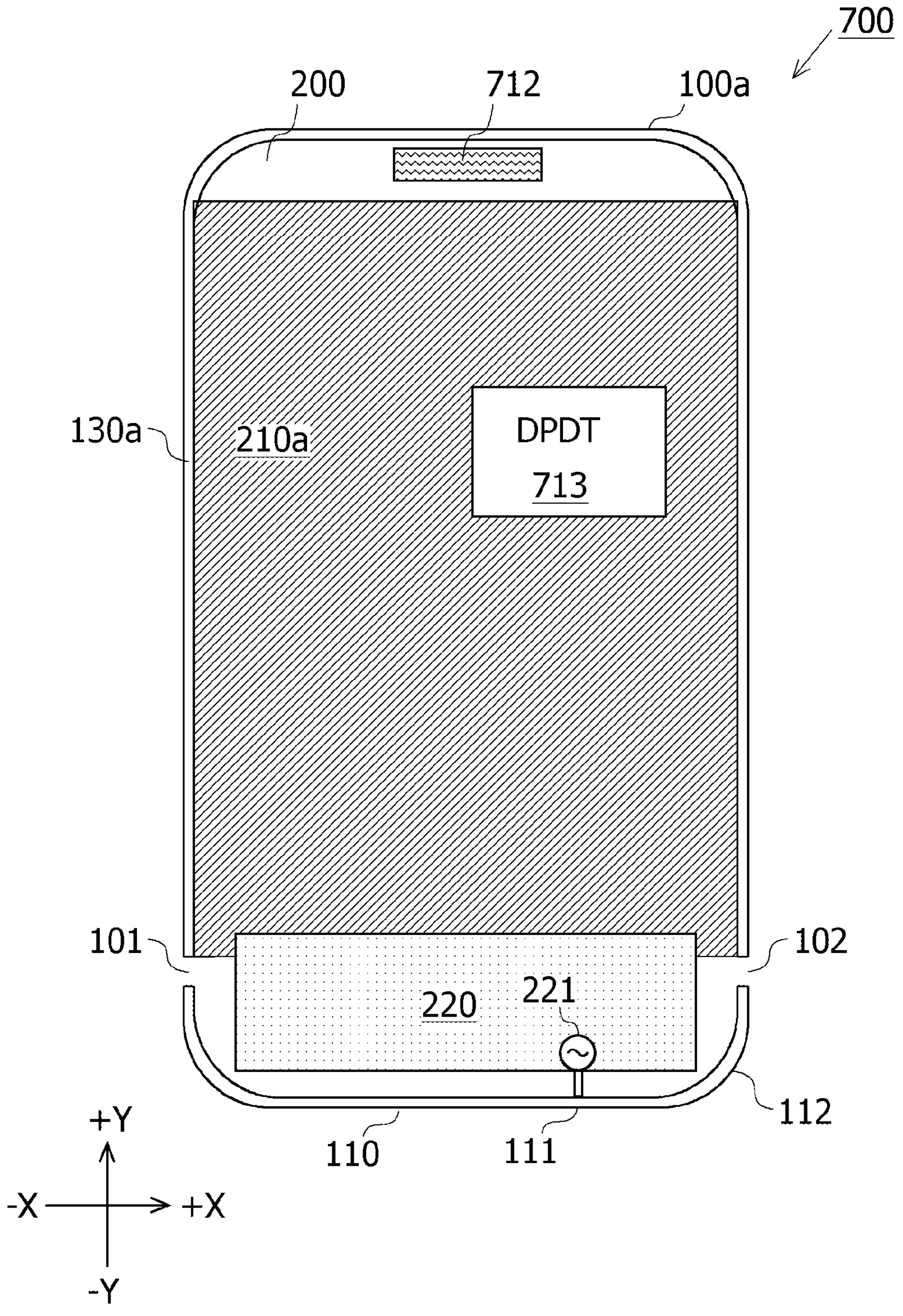
FIG. 10 is a diagram showing an example of a smartphone according to a third comparative example.

Furthermore, other comparative examples which correspond to a decline in radiation efficiency of an antenna when the slit 102 is capacitively coupled will be considered. FIG. 10 is a diagram showing an example of a smartphone according to a third comparative example. FIG. 10 illustrates a state where a front surface-side cover of a smartphone 700 according to the third comparative example has been opened. The smartphone 700 includes, in addition to the antenna device 112, an antenna 712 in an upper part inside the main body portion 200. When the smartphone 700 detects capacitive coupling of the slit 102 by the thumb F1 or the like, the smartphone 700 uses a Dual Pole Dual Throw (DPDT) 713 to switch an antenna used for communication from the antenna device 112 to the antenna 712.

For example, various electronic components such as a camera and a speaker are often mounted in an upper part inside the main body portion 200. Therefore, an antenna length of the antenna 712 is often reduced in the upper part inside the main body portion 200. Furthermore, since the electronic components described above are present around the antenna 712 in addition to the reduced antenna length, performance of the antenna 712 tends to become lower than that of the antenna device 112 and a frequency band in which the antenna 712 can resonate tends to become narrower. Therefore, there is a possibility that switching from the antenna device 112 to the antenna 712 may end up reducing antenna performance of the smartphone 700.

Figure 11:
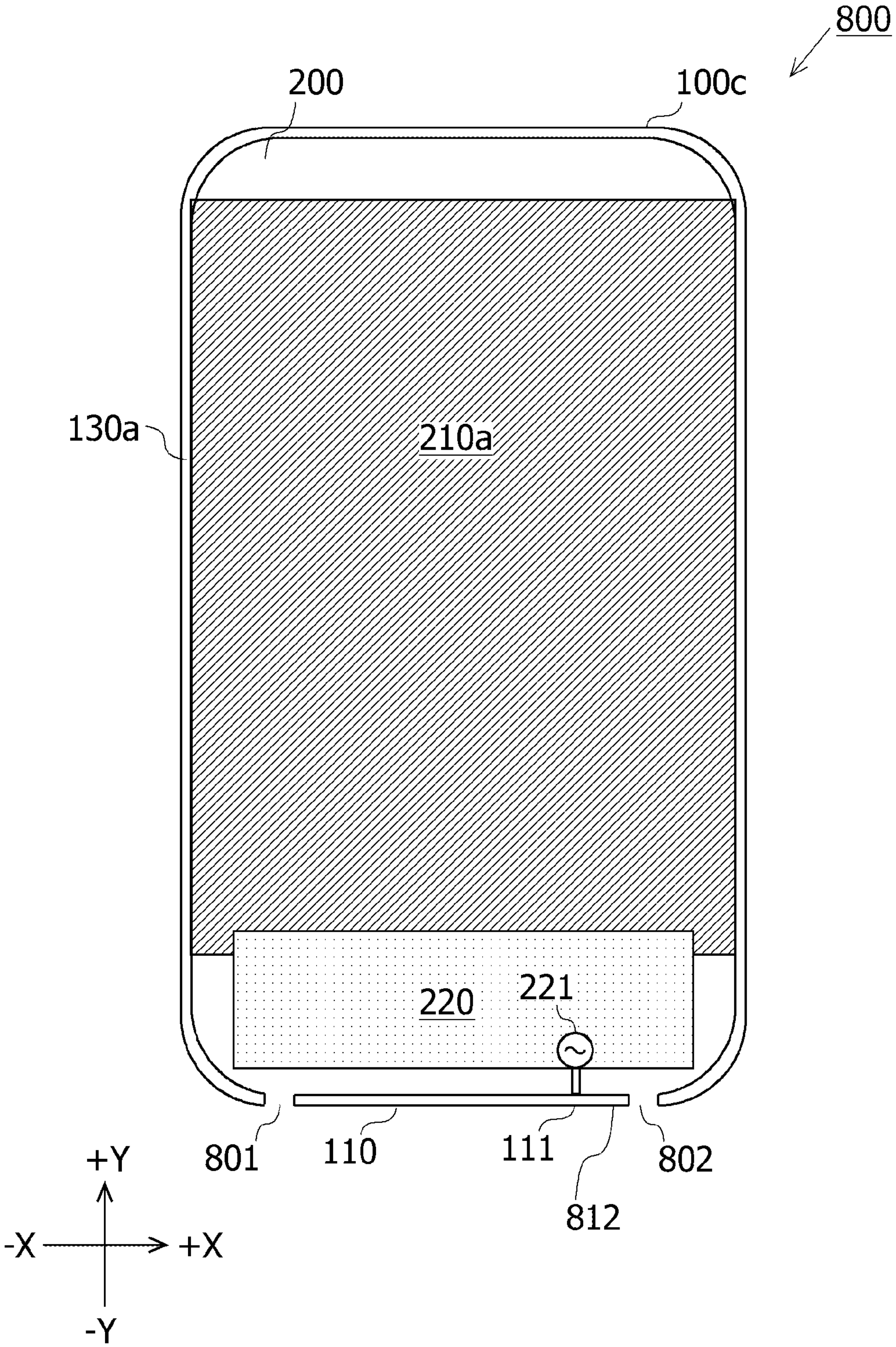
FIG. 11 is a diagram showing an example of a smartphone according to a fourth comparative example.

FIG. 11 is a diagram showing an example of a smartphone according to a fourth comparative example. FIG. 11 illustrates a state where a front surface-side cover of a smartphone 800 according to the fourth comparative example has been opened. In the smartphone 800, two slits 801 and 802 are provided on a lower side of a side surface frame 100*c* formed in an approximately rectangular shape. In the smartphone 800, a section from the intermediate portion 111 to an end on a side of the slit 802 constitutes an antenna device 812.

By providing the slits 801 and 802 at these positions, since a hand such as the thumb F1 less readily comes into contact with the slits 801 and 802 even when the smartphone 800 is gripped by the hand, the slits 801 and 802 are less likely to be capacitively coupled. Therefore, with the smartphone 800, deterioration in performance of the antenna device 812 when the smartphone 800 is gripped by a hand is conceivably suppressed.

Let us now consider providing the smartphone 800 with a plurality of antennas in order to accommodate a plurality of frequencies. A size of the smartphone 800 is set so as to be 150 mm in a longitudinal direction (V direction) and 75 mm in a width direction (X direction), and the slits are assumed to be filled by a resin with relative permittivity of 3.0. In this case, ¼ wavelength of a radio wave at a frequency of 850 MHz is 51 mm, ¼ wavelength of a radio wave at 1.5 GHz is 29 mm, and ¼ wavelength of a radio wave at 2.2 GHz is 20 mm.

Figure 12:
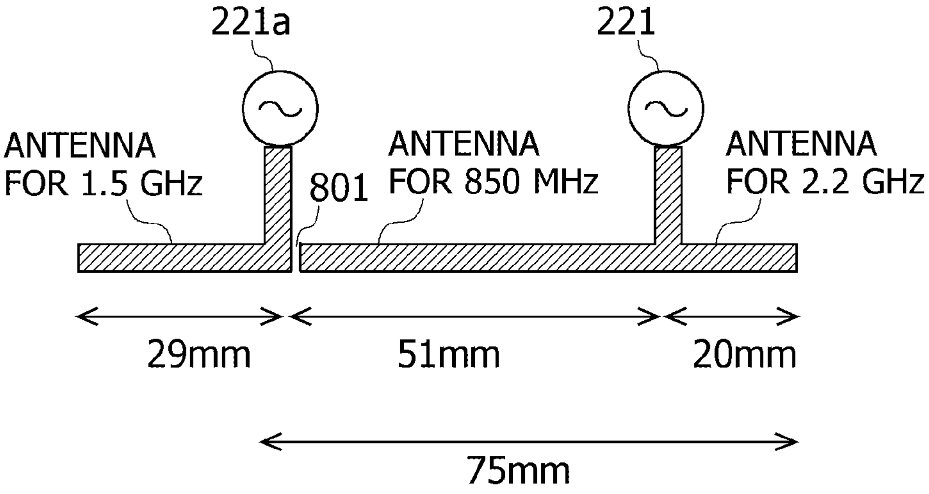
FIG. 12 is a diagram schematically showing a case where the smartphone according to the fourth comparative example is provided with antennas for a plurality of frequencies.

FIG. 12 is a diagram schematically showing a case where the smartphone according to the fourth comparative example is provided with antennas for a plurality of frequencies. Referring to FIG. 12, it can be understood that when attempting to provide the smartphone 800 with an antenna for 850 MHz, an antenna for 1.5 GHz, and an antenna for 2.2 GHz, it turns out that it is difficult to mount the antennas to the smartphone 800 because the length of the antennas exceeds the width direction dimension of 75 mm.

Figure 13:
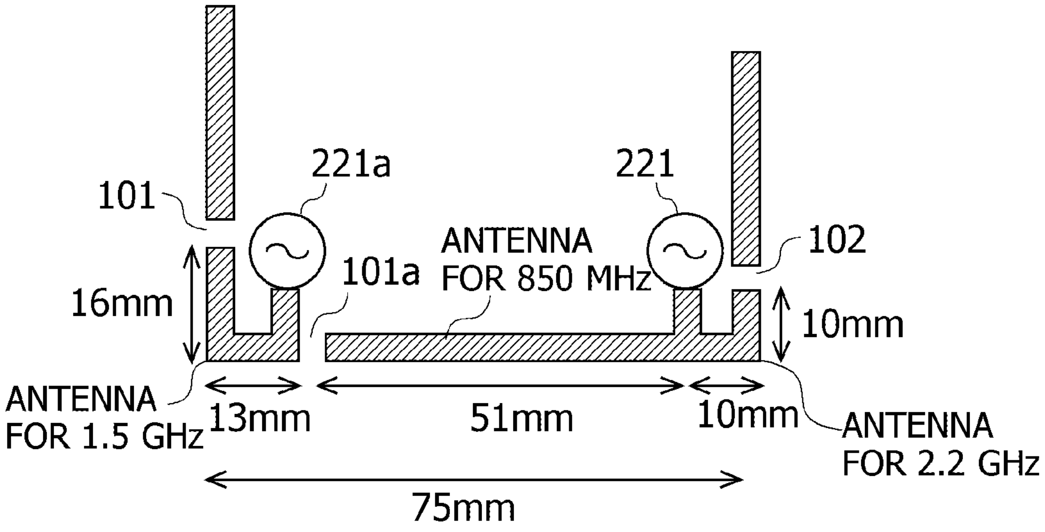
FIG. 13 is a diagram schematically showing a case where the smartphone according to the embodiment is provided with antennas for a plurality of frequencies.

FIG. 13 is a diagram schematically showing a case where the smartphone according to the embodiment is provided with antennas for a plurality of frequencies. In the smartphone 1 according to the embodiment, since the slits 101 and 102 are provided in lower parts of opposing long sides among the side surface frame 100, it can be understood that appropriately determining the positions of the slits 101 and 102 enables an antenna length of each antenna for the frequencies of 850 MHz, 1.5 GHz, and 2.2 GHz to be secured. It can also be understood that providing a slit 101*a* of around 1 mm between the antenna for 850 MHz and the antenna for 1.5 GHz enables the antenna for 850 MHz and the antenna for 1.5 GHz to be insulated from each other. In other words, the smartphone 1 according to the embodiment is also advantageous for enabling mounted antennas to accommodate a plurality of frequency bands.

First Modification

Figure 14:
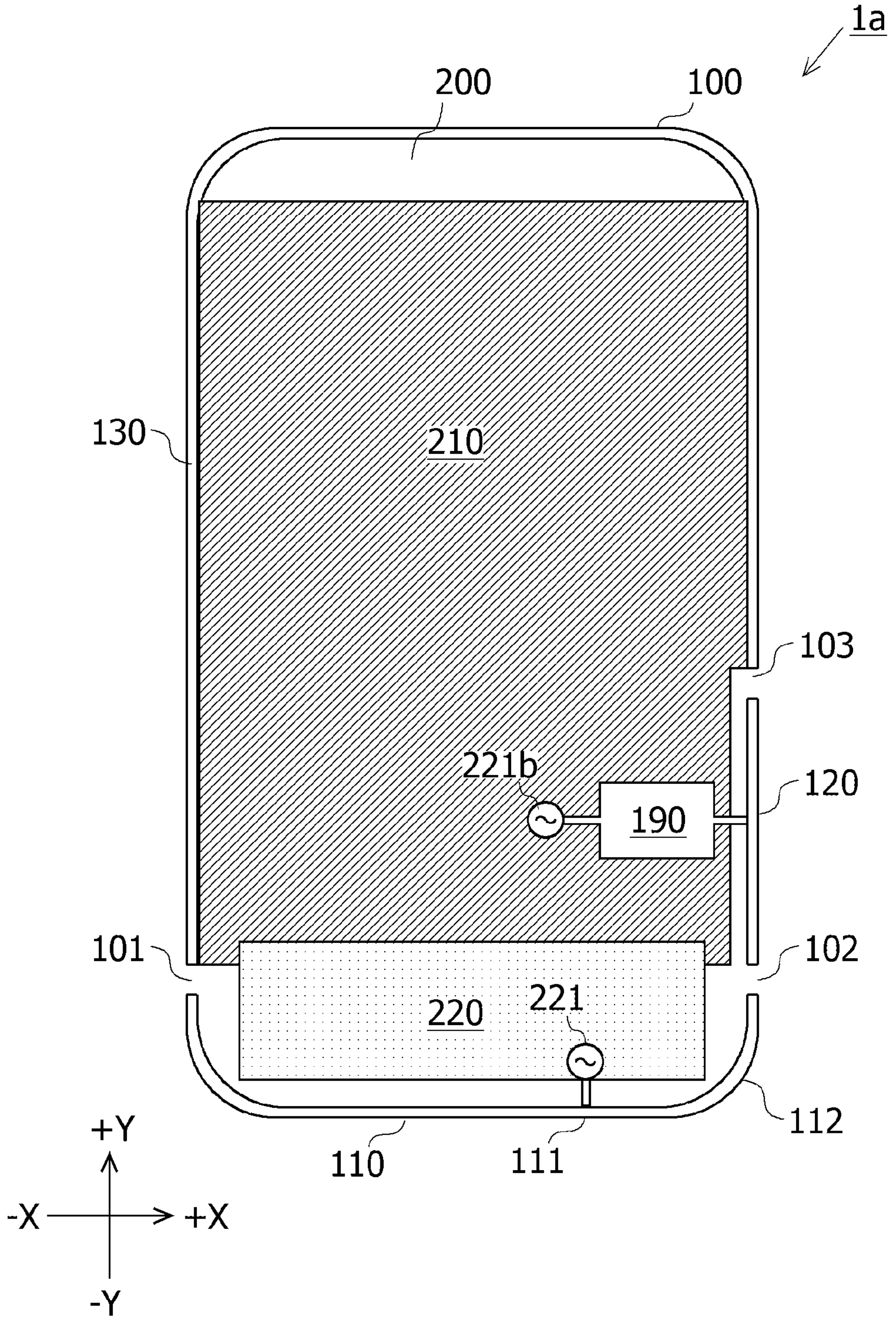
FIG. 14 is a diagram showing an example of a smartphone according to a first modification.

The smartphone according to the embodiment can be modified in various ways. FIG. 14 is a diagram showing an example of a smartphone according to a first modification. FIG. 14 illustrates a state where a front surface-side cover of a smartphone 1*a* according to the first modification has been opened. In the smartphone 1*a*, a feeding point 221*b* is connected to the side surface conductor device 120 via a selection circuit 190. The selection circuit 190 separates the side surface conductor device 120 from the feeding point 221*b* when communication by a radio wave at the first frequency is being performed but connects the side surface conductor device 120 to the feeding point 221*b* when communication by a radio wave at a second frequency is to be performed. Such an implementation enables the smartphone 1*a* to use the side surface conductor device 120 as an antenna which resonates with a radio wave at the second frequency when communication is not being performed at the first frequency. The selection circuit 190 is an example of the "selection circuit". The feeding point 221*b* is an example of the "second feeding point".

Figure 15:
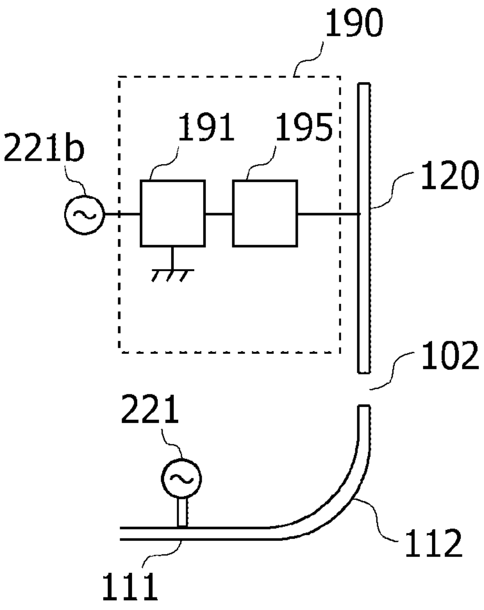
FIG. 15 is a diagram showing another example of a selection circuit.

FIG. 15 is a diagram showing another example of a selection circuit. FIG. 15 also illustrates the antenna device 112 and the side surface conductor device 120. In the selection circuit 190 illustrated in FIG. 15, a switch 195 is interposed between a matching circuit 191 and the side surface conductor device 120. The switch 195 separates the side surface conductor device 120 from the feeding point 221*b* when communication at the first frequency is being performed (for example, when power is being fed by the feeding point 221). In addition, the switch 195 connects the feeding point 221*b* and the side surface conductor device 120 to each other when communication at the first frequency is not being performed (for example, when power is not being fed by the feeding point 221). Even such an implementation enables the smartphone 1*a* to communicate using the antenna device 112 at the first frequency and to communicate using the side surface conductor device 120 as an antenna at the second frequency.

Figure 16:
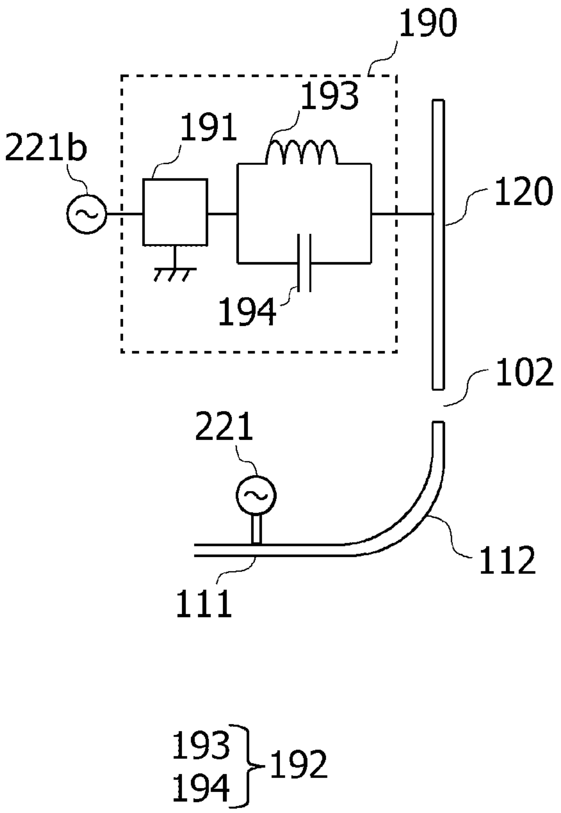
FIG. 16 is a diagram showing an example of a configuration which switches frequencies using a circuit other than a switch.

A portion of the selection circuit 190 can also be configured to switch frequencies using a circuit other than a switch. FIG. 16 is a diagram showing an example of a modification thereof. FIG. 16 also illustrates the antenna device 112 and the side surface conductor device 120. In the selection circuit 190 illustrated in FIG. 16, an LC parallel circuit 192 in which a coil 193 and a capacitor 194 are connected in parallel is interposed between the matching circuit 191 and the side surface conductor device 120. By causing the LC parallel circuit 192 to resonate at the first frequency at which the antenna device 112 resonates, the LC parallel circuit 192 can be set to high impedance at the first frequency. In other words, when communication at the first frequency is being performed, the side surface conductor device 120 can be separated from the feeding point 221*b* at a high frequency. In addition, at the second frequency which differs from the first frequency, since the LC parallel circuit 192 operates as a part of the matching circuit, communication can be performed by using the side surface conductor device 120 as an antenna.

While the side surface frame 100 is formed in a rectangular shape in the embodiment and the modifications described above, the side surface frame 100 may be formed in other shapes such as a square shape, a circular shape, and a rhombic shape. In this case, the positions of the slits 101, 102, and 103 need only be determined so that the length of the antenna device 112 is a length that enables the antenna device 112 to resonate at the first frequency and the length of the side surface conductor device 120 is an odd multiple of ¼ of a wavelength of a radio wave at the first frequency.

The embodiment and the modifications disclosed above can be combined with each other.

The disclosed technique enables, in a wireless communication apparatus which uses a metal frame constituting an exterior as an antenna, a decline in antenna performance due to a hand coming into contact with the metal frame to be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication apparatus, comprising:

a metal frame which encloses a side surface of a main body portion formed in a plate shape; and a ground plate which is housed in the main body portion, wherein the metal frame includes:

a monopole antenna which is electrically connected to a feeding point at an intermediate portion of a first frame defined by a first gap and a second gap provided on the metal frame and which resonates with a radio wave at a first frequency defined by the intermediate portion and the second gap;

a first conductive portion which is defined by the second gap and a third gap provided on the metal frame and which is insulated from the ground plate; and a second conductive portion which is defined by the first gap and the third gap and of which at least an end on the third gap side is electrically connected to the ground plate, a length combining the monopole antenna and the first conductive portion being a length enabling the monopole antenna and the first conductive portion to resonate with a radio wave at the first frequency as a loop antenna.

2. The wireless communication apparatus according to claim 1, wherein a length of the first conductive portion is ¼ of a wavelength of the radio wave at the first frequency.

3. The wireless communication apparatus according to claim 1, wherein the metal frame is formed in a rectangular shape, and the first gap and the second gap are formed on opposing long sides of the metal frame formed in a rectangular shape.

4. The wireless communication apparatus according to claim 1, wherein a second feeding point which differs from the feeding point is connected to the first conductive portion, and a selection circuit is interposed between the first conductive portion and the second feeding point, the selection circuit separating the first conductive portion and the second feeding point from each other when power is being fed to the monopole antenna at the first frequency and connecting the first conductive portion and the second feeding point to each other when power is not being fed to the monopole antenna at the first frequency.

5. The wireless communication apparatus according to claim 4, wherein the selection circuit includes an LC parallel circuit which opens at the first frequency.

6. The wireless communication apparatus according to claim 4, wherein the selection circuit includes a switch which separates the first conductive portion from the second feeding point when power is being fed to the monopole antenna from the feeding point and which connects the first conductive portion to the second feeding point when power is not being fed to the monopole antenna from the feeding point.

* * * * *